May 14, 1929.  C. J. McDONNELL  1,712,627
WRIST PIN
Original Filed April 25, 1927
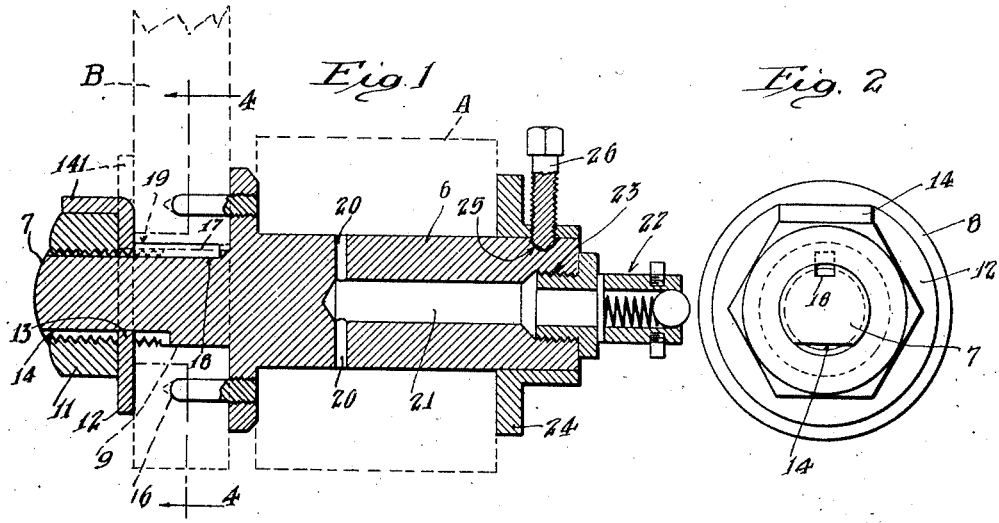
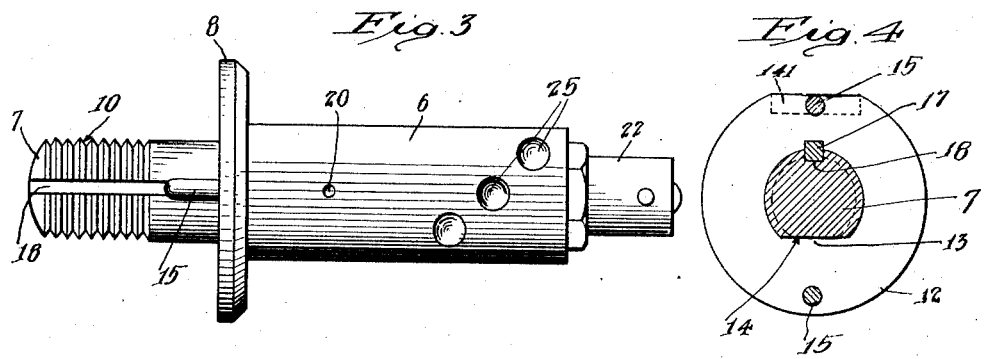
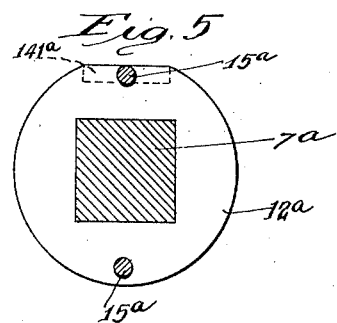
Inventor
Clement J. McDonnell
By Lyon & Lyon
Attorneys Patented May 14, 1929.

1,712,627

UNITED STATES PATENT OFFICE.

CLEMENT J. McDONNELL, OF TITUSVILLE, PENNSYLVANIA.

WRIST PIN.

Application filed April 25, 1927, Serial No. 186,344. Renewed October 15, 1928.

This invention relates to wrist pins and, although this new pin may be used to advantage anywhere that such pins are required, it is especially useful in pivotally connecting the crank to the pitman in the operating mechanism used in the drilling and pumping of wells. It is the present practice in the art relating to the drilling and pumping of wells, especially oil wells, to secure the wrist pin to the crank and to journal the pitman on said pin. The present wrist pins, after a short time in operation, work loose in the cranks and enlarge the holes through which the wrist pins pass and, thus, the wrist pins become looser and looser. One of the principal objects of this invention is to make provision for firmly anchoring the wrist pin to the crank so that it will not work loose. It will be readily understood that working loose of the wrist pin entails the installation of a new pin, and that the new pin must be made larger than the old one in order to tightly fit in the crank. It follows that the substituted pin must be of special construction, thus entailing large expense.

Other objects and advantages will appear in the subjoined detailed description.

The accompanying drawings illustrate the invention.

Figure 1 is a longitudinal section of a wrist pin constructed in accordance with the provisions of this invention, fragments of a crank and pitman being indicated in broken lines. The locking lug on the washer is shown in solid lines in position to lock the nut and is shown in broken lines in its original position, before bending.

Figure 2 is an elevation from the left of Figure 1.

Figure 3 is a longitudinal view of the pin body.

Figure 4 is a sectional view on the line indicated by 4—4, Figure 1.

Figure 5 is a sectional view similar to Figure 4 showing a modified form of pin body.

The body of the pin comprises portions having different diameters, a pitman pivoting portion 6, a crank engaging anchoring portion or stud 7, and an annular flange 8 interposed between the portions 6, 7. In this instance, the portion 6 is of slightly larger diameter than the portion 7. The pitman, indicated at A, is engaged by the body portion 6 and the portion 7 passes through a hole 9 in the crank which is indicated at B. The portion 7 is provided with screw threads 10 to hold a nut 11.

In this instance, a washer 12 is interposed between the crank and the nut 11 and said washer is held against turning relative to the stud 7 by reason of it being provided with an inwardly projecting lug 13 which projects into a slot 14 extending longitudinally in the stud 7. The nut 11 is locked against turning, after being screwed up tight, by a laterally projecting flange 141 on the washer 12, said flange being bent outwardly from the washer after the nut is in position. When the washer is manufactured, the flange 141 is aligned with the body of the washer as indicated in broken lines in Figure 1.

Projecting from the flange 8 is a dowel or dowels 15 which project into holes 16 in the crank. The dowels may be secured to the flange 8 in any suitable manner and, in this instance, are screw threaded into said flange. It will be seen that the dowels prevent turning of the flange 8, thus preventing, or aiding in preventing, the turning of the stud 7 in the crank. In this instance, the stud 7 in Figures 1 to 4, is circular in cross section and it may also be advisable to provide further means for preventing turning of the stud 7 in the crank and such means may be, for example, a key 17 fitting in a key seat 18 in the periphery of the stud 7. The key 17 engages in a key seat 19 in the crank.

From the foregoing it will now appear that the invention comprises the relatively large flange 8 with means to secure said flange to the crank. The flange 8 tends to prevent rocking of the stud in the crank and the dowels also aid in preventing such rocking, thus insuring against the hole 9 in the crank being increased in size. It is to be understood that either the dowels or the key may be omitted, although it is preferable to employ both.

The body portion 6 is provided with a radially extending oil duct or ducts 20 which communicate with an axial duct 21 which may be filled with lubricant through a valved nipple 22 that is screw threaded or otherwise secured to the body portion 6, as indicated at 23.

Adjustably secured to the body portion 6 is a flanged collar 24, the pitman being interposed between the flange 8 and said collar 24. To adjustably secure the collar 24 in place, the body portion 6 is provided with a plurality of seats 25 which may be selectively engaged by a set screw 26 that is screw threaded through the collar 24. The seats 25 are positioned at intervals along the body portion 6.

To use the invention described above, the pin body will be separated from the elements that secure it to the crank and pitman, and the stud 7 will be driven into the hole 9 provided for it in the crank and the studs 15 will engage in the holes 16. Then the washer 12 will be placed over the stud and the nut 11 screwed tightly against said washer, and then the flange 141 will be bent outwardly against the side of the nut as in solid lines in Figure 1. This firmly secures the pin body to the crank.

The pitman will then be slid onto the body portion 6, the collar 24 placed in position on the end portion of the pin body outside of the pitman and the set screw 26 will be engaged with the appropriate seat 25 so as to prevent the pitman from sliding off of the pin body. A quantity of lubricant will then be injected through the nipple 22 into the duct 21 so as to properly lubricate the bearing surfaces of the pin body and pitman. The crank and pitman are now suitably connected for operation.

In Figure 5, the elements that functionally correspond to those illustrated in Figures 1 to 4 inclusive, are indicated by the same reference characters with the addition of the letter *a*. It will be noted that in Figure 5 the stud 7ª instead of being of circular cross section, is rectangular in cross section and, accordingly, a key corresponding to the key 17 is not necessary, and is omitted.

I claim:

1. A wrist pin comprising a body provided with a crank-engaging portion and a pitman-engaging portion and a flange between said portions, a means fixed to the flange to secure the flange to the crank, a nut screwed onto the crank-engaging portion, a collar on the pitman-engaging portion, and a means to hold the collar in place.

2. A wrist pin comprising a body provided with a crank-engaging portion and a pitman-engaging portion and a flange between said portions, the crank-engaging portion provided with a slot, a means fixed to the flange to secure the flange to the crank, a nut screwed onto the crank-engaging portion, a collar on the pitman-engaging portion, a means to hold the collar in place, and a washer between the nut and flange provided with an inwardly projecting lug projecting into the slot, said washer having a laterally projecting flange bent outwardly along the edge of the nut to prevent unscrewing thereof.

3. A wrist pin comprising a body provided with a crank-engaging portion and a pitman-engaging portion and a flange between said portions, a means fixed to the flange to secure the flange to the crank, a key mounted in the crank-engaging portion to engage the crank, a nut screwed onto the crank-engaging portion, a collar on the pitman-engaging portion, and a means to hold the collar in place.

4. A wrist pin comprising a body provided with a crank-engaging portion and a pitman-engaging portion and a flange between said portions, the crank-engaging portion provided with a slot, a key mounted in the crank-engaging portion to engage the crank, a nut screwed onto the crank-engaging portion, a collar on the pitman-engaging portion, a means to hold the collar in place and a washer between the nut and flange provided with an inwardly projecting lug projecting into the slot, said washer provided with a laterally projecting flange bent outwardly along the edge of the nut.

5. A wrist pin comprising a body provided with a crank-engaging portion and a pitman-engaging portion and a flange between said portions, a nut screwed onto the crank-engaging portion, a means to prevent turning of the crank-engaging portion in the crank, the crank-engaging portion provided with a slot, a washer between the nut and flange provided with an inwardly projecting lug engaging in the slot, the washer having a laterally projecting flange extending along the edge of the nut, a collar on the pitman-engaging portion, a means to hold the collar in place, and a nipple screwed into one end of the body, said body provided with a duct communicating with the nipple and provided with a lateral duct connected with the first duct and opening to the periphery of the pitman-engaging portion.

Signed at Los Angeles, this 18th day of April, 1927.

CLEMENT J. McDONNELL.